United States Patent [19]

Kuwako et al.

[11] 3,936,680
[45] Feb. 3, 1976

[54] MINIATURE SELF-STARTING ELECTRIC MOTOR

[75] Inventors: Tomohisa Kuwako, Anjo; Toshio Tanase, Gifu; Naoshi Sasase, Toyohashi, all of Japan

[73] Assignee: Kabushiki Kaisha Tokai Rika Denki Seisakusho, Japan

[22] Filed: July 9, 1974

[21] Appl. No.: 486,789

[30] Foreign Application Priority Data
July 10, 1973 Japan.............................. 48-77684
July 11, 1973 Japan.............................. 48-78145

[52] U.S. Cl. ............ 310/40 MM; 310/72; 310/154
[51] Int. Cl.² ................... H02K 11/00; H02K 21/26
[58] Field of Search ..... 310/40 MM, 162, 181, 163, 310/266, 164, 161, 49, 167, 156, 114, 72, 41, 155, 152; 318/207 B, 207 R:185, 220, 221 D

[56] References Cited
UNITED STATES PATENTS

| | | | |
|---|---|---|---|
| 2,498,957 | 2/1950 | Jordan.............................. | 318/207 B |
| 2,548,633 | 4/1951 | Stephenson........................ | 310/164 |
| 2,997,612 | 8/1961 | Jager................................. | 310/164 |
| 3,416,017 | 10/1968 | Krug................................. | 310/41 |
| 3,571,638 | 3/1971 | Inariba............................. | 310/164 |
| 3,684,907 | 8/1972 | Hinachi............................. | 310/155 |
| 3,840,761 | 10/1974 | Muller.............................. | 310/49 |

Primary Examiner—R. Skudy
Attorney, Agent, or Firm—Woodhams, Blanchard and Flynn

[57] ABSTRACT

A miniature self-starting electric motor includes a rotor shaft rotatably disposed in a casing. Two rotors fixed to said rotor shaft each have a circular body portion of soft magnetic material, said circular body portion having a periphery with pole teeth extending therefrom and spaced from each other at equal angular spacings. Two exciting coils each are disposed to face the pole teeth. Two magnets each provide radially north and south poles alternating at an equal angle with axially same polarities as the other magnet and facing the pole teeth, the number of poles on each permanent magnet being an even multiple of the number of pole teeth. The two rotors are in an opposite relation each other, the pole teeth of one of said two rotors being staggered from the pole teeth of the other by a predetermined electric angle. A condenser is selectively connectible to either one of said two exciting coils. Such miniature self-starting motor rotates reliably in a predetermined direction at the time of starting. Further, the direction of rotation can be selectively determined by operating a switch.

9 Claims, 8 Drawing Figures

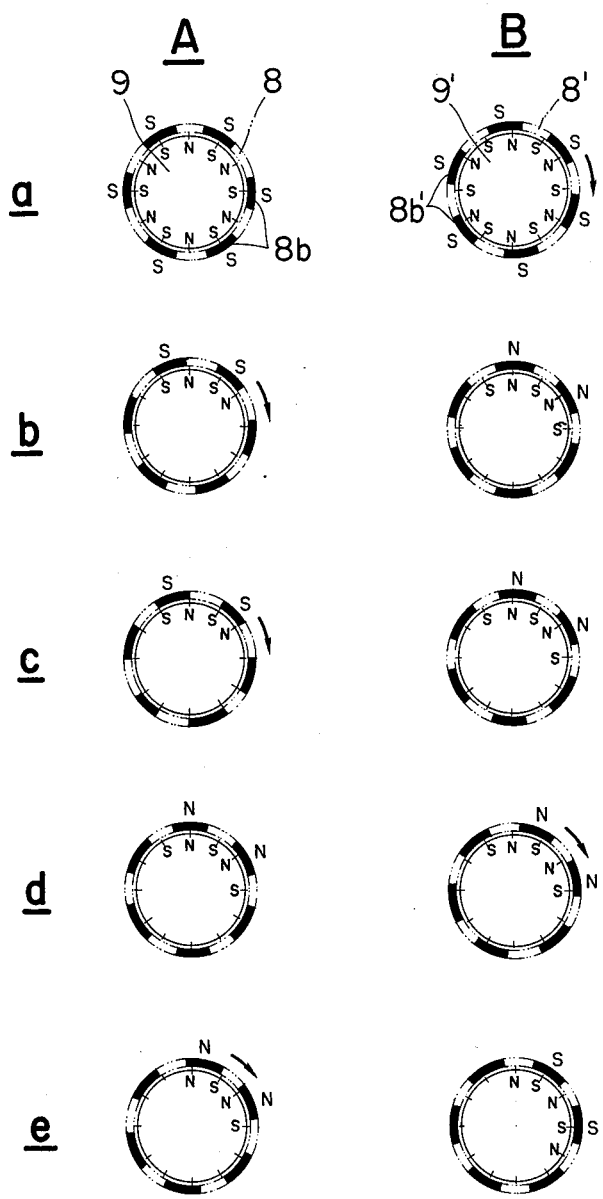

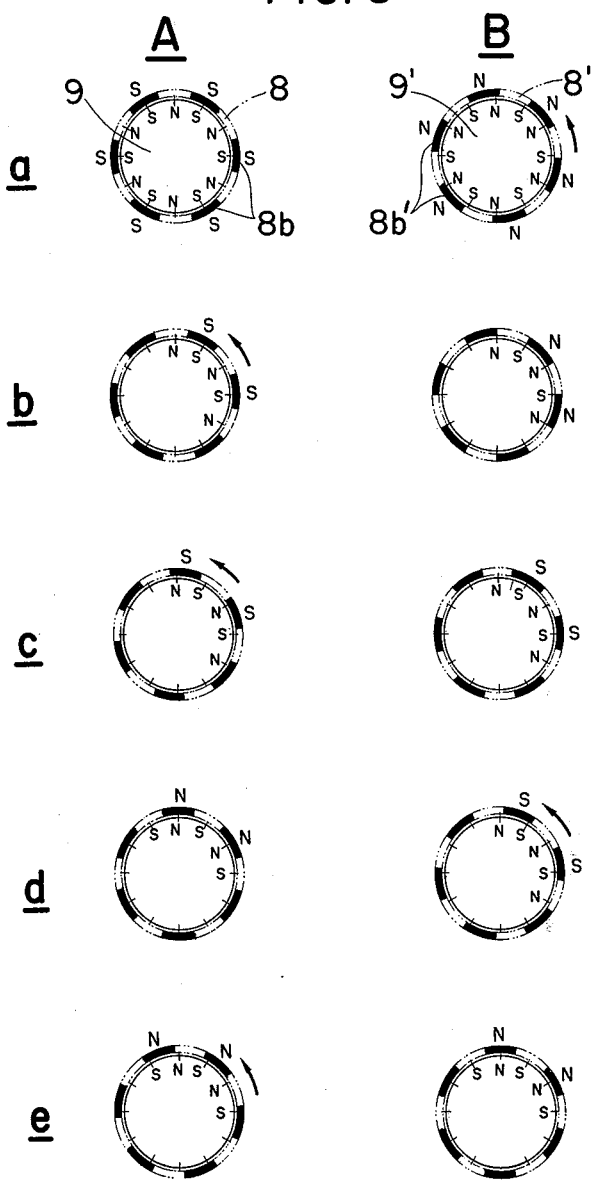

MINIATURE SELF-STARTING ELECTRIC MOTOR

This invention relates to a miniature self-starting electric motor and more particularly to a miniature self-starting electric motor provided with two rotors, wherein pole teeth of one rotor are staggered from pole teeth of the other by an electric angle of 96° to 120°, thereby to enable said rotors to start their rotation reliably in a predetermined direction.

In a known self-starting electric motor, the probability of rotation in a predetermined direction at the time of starting is 50 percent. To overcome this drawback, there has been proposed incorporation of anti-reverse mechanism, e.g. a gear mechanism, into conventional motors of this type. This means that two sets of such gear mechanism are set in a single motor since it is generally required to perform rotation in two opposite directions from a commercial point of view. However use of two sets of such gear mechanism is not practicable in a miniature motor which should be compact in construction. Furthermore, with such a conventional motor having a gear mechanism, the time required for the motor to start its rotation varies since time lag caused in the anti-reverse mechanism is not always kept at the same level. If the self-starting electric motor, in which the time lags in the start of rotation are not constant, is employed in such a machine as an electronic computer, there is, for example, such a disadvantage that the length of computer output tape fed by rotation of the motor is not kept constant.

It is therefore an object of the present invention to provide a miniature self-starting electric motor which performs rotation reliably in a predetermined direction at the time of starting without incorporating any additional anti-reverse mechanism.

It is another object of the present invention to provide a miniature electric motor which performs rotation selectively in either direction by operating a switch.

It is a further object of the present invention to provide a miniature self-starting electric motor which is free from a time lag in the starting of rotation.

The invention will be better understood from the following description taken in connection with the accompanying drawings in which:

FIG. 7 is an explanatory view showing the movements of the rotors when the switch is closed as shown in a full line in FIG. 5;

FIG. 8 is an explanatory view showing the movements of the rotors when the switch is closed as shown in a dotted line in FIG. 5;

In the drawings and the following description, like portions or parts are denoted by like numerals or characters.

Essentially, according to the present invention, there is provided a miniature self-starting electric motor comprising a rotor shaft rotatably disposed in a casing; two rotors fixed to said rotor shaft and each having a circular body portion of soft magnetic material, said circular body portion having a periphery with pole teeth extending therefrom and spaced from each other at equal angular spacings; two exciting coils each being disposed to face the pole teeth; two magnets each providing radially north and south poles alternating at an equal angle and axially same polarities as the other magnet and facing the pole teeth, the number of poles on eaach permanent magnet being an even multiple of the number of pole teeth, said two rotors being in an opposite relation each other the pole teeth of one of said two rotors being staggered from the pole teeth of the other by a predetermined electric angle; and a condenser to be selectively connected to either one of said two exciting coils.

Figure 2:
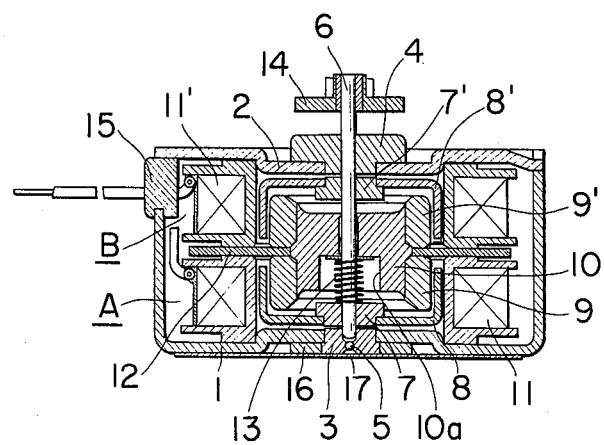
FIG. 2 is a longitudinal cross sectional view of one form of a miniature self-starting electric motor according to the present invention.
Figure 3:
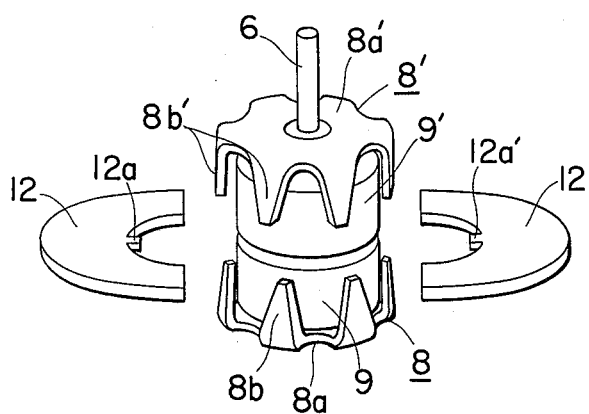
FIG. 3 is a perspective view showing main components of the miniature self-starting electric motor as shown in FIG. 2, with semi-circular iron members exploded therefrom.
Figure 4:
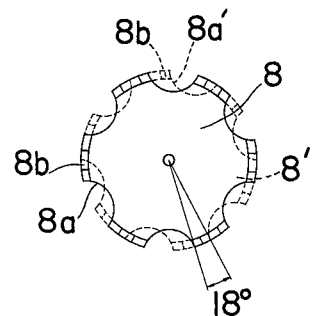
FIG. 4 is a plan view showing a relation in which the respective pole teeth of the two rotors in FIG. 2 are staggered.

Referring now to FIGS. 2 to 5, 7 and 8, there is illustrated one preferred embodiment of the present invention. A cylindrical casing of the miniature self-starting electric motor is composed of a motor case 1 and a lid 2, which are provided with bearings 3 and 4, respectively. A hard steel ball 5 is disposed in the bearing 3. A rotor shaft 6 is supported by the bearings 3 and 4. Bosses 7 and 7' of non-magnetic material, for example aluminum, are fixed to the rotor shaft 6 as depicted. Rotors 8 and 8' of soft magnetic iron are respectively fixed to the aluminium bosses 7 and 7' and respectively have circular body portions 8a and 8a'. From the periphery of each of the circular body portions 8a and 8a' are extending pole teeth each tapered from its base portion towards its free end. The pole teeth of one of the two rotors and the pole teeth on the other are in an opposite relation, i.e. the rotors are axially opposed with their sets of pole teeth facing. FIG. 4 shows the lower circular body portion 8a drawn in a full line and the upper circular body portion 8a' drawn in a dotted line, such body portions being staggered from each other with respect to their positions of the pole teeth so that the upper circular body portion 8a' is 18° (108° electric degrees) ahead of the lower circular body portion 8a in the clockwise direction. Cylindrical magnets 9 and 9' are firmly attached to a stator of synthetic resin 10. There are provided north and south poles alternating at an equal angle on both peripheries of the cylindric magnets. The north and south poles on the magnet 9' are right above same poles on the magnet 9. The number of poles magnetized on each permanent magnet is an even multiple of the number of pole teeth on each circular body portion. Annular exciting coils 11 and 11' are provided concentrically with said rotors 8 and 8'.

On the inner peripheries of semi-circular iron members 12 and 12' are formed projections 12a and 12a' as shown in FIG. 3, which are to be engaged with concaves (not shown) on the resin member 10.

Figure 1:
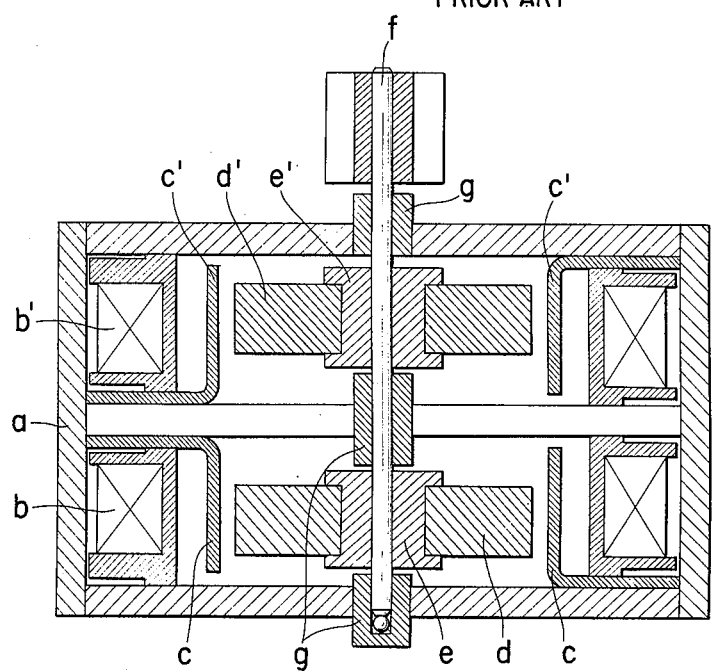
FIG. 1 is a longitudinal cross sectional view of a conventional electric motor.

In this connection, FIG. 1 shows a conventional self-starting motor, wherein there are provided two exciting coils b and b' fixed on an inner wall of a casing a, two permanent magnets d and d' whose peripheries are magnetized radially and alternatingly to provide north and south poles and stationary pole teeth c and c' magnetized by the current flowing through said exciting coils *b* and *b'*. Said pole teeth *c* and *c'* are arranged in parallel with peripheries of said permanent magnets (the latter being used for rotors) leaving an air gap therebetween. Characters *e* and *e'* designate bosses of non-magnetic material to fix permanent magnets *d* and *d'* on the rotor shaft *f* which is supported by bearings *g*, *g*, *g* fixed to the casing *a*.

In an electric motor assembly as shown in FIG. 1, it is extremely difficult to dispose the two sets of poles on the two permanent magnets *d* and *d'* in a predetermined relation since the magnets *d* and *d'* are separately attached to the bosses *e* and *e'* after being magnetized.

In contrast as described before, in one embodiment of the present invention, the two semicircular iron members 12 and 12' are employed. By incorporating these two semi-circular iron members so that the two rotors, the two permanent magnets and the two exciting coils are separated into each combination of one rotor, one permanent magnet and one exciting coil, it has become possible that two material members to be magnetized into the two permanent magnets are first fixed to the stator and then magnetized. Due to the above-mentioned sequence in working, it is possible to dispose in the casing the two magnets which have been prepared by assembling materials and simultaneously magnetizing them, so that portions magnetized in the same polarity on both magnets are aligned when viewed in the axial direction.

Figure 5:
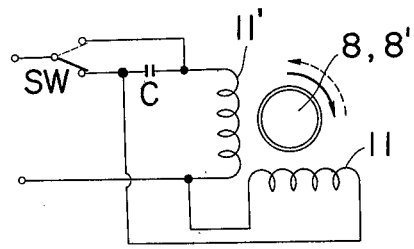
FIG. 5 is a circuit diagram used in the miniature self-starting motor as shown in FIG. 2.
Figure 6:
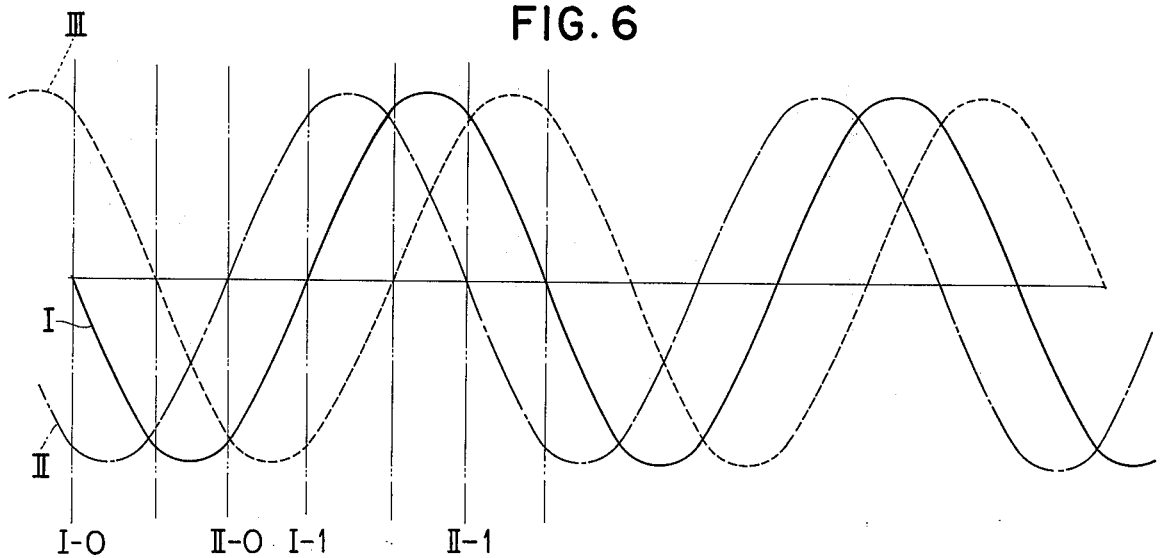
FIG. 6 is a wave form chart plotting the exciting currents flowing through the exciting coils in FIG. 5.

Back to FIGS. 2 to 5, 7 and 8 showing the present invention, the permanent magnets 9 and 9' attached to a stator 10 of non-magnetic material, such as synthetic resin, are positioned concentric with the rotors 3 and 3'. The exciting coils 11 and 11', the permanent magnets 9 and 9' and the rotors 8 and 8' constitute two sets of synchronous electric motors A and B as shown in FIG. 2. A compression spring 13 is disposed to wind around the rotor shaft 6, one end of the spring contacting a shoulder on the recessed portion 10*a* on the stator, the other end an aluminum boss 7. In consequence the rotors 8 and 8' are pressed toward the ball 5 by a weak force, thus preventing the rotors from being magnetically vibrated by magnetic fluxes. A gear 14 is fixed to the rotor shaft 6 for transmitting the driving force to a load outside the casing. Cords from said exciting coils 11 and 11' go out of the casing through a bush 15 of insulating material. An oil impregnated felt 16 supplies the ball 5 with oil. A name plate 17 also serves to prevent oil leakage from the oil impregnated felt. When viewed from the gear 14 side, the exciting coil 11 is wound clockwise while the exciting coil 11' is wound counterclockwise. With this construction of the exciting coils, they are magnetized in a manner opposite to each other when connected to the power source. In a device separately composed of the motor A or B, it is often impossible to obtain torque when corresponding pole teeth 8*b* and 8*b'* of the rotor 8 and 8' happen to be right above the permanent magnet poles simultaneously and a direction of rotation can not be determined. To avoid this disadvantage, we adopted a two-phase construction and the exciting coils 11 and 11' are arranged so that they show the phase difference of 60°. The exciting coils 11 and 11' used in the synchronous motor of the above structure are connected as shown in FIG. 5, namely the exciting coils 11 and 11' are connected in parallel with each other and a condenser *c* is adapted to be selectively connected to either of said two exciting coils. Therefore, when the switch SW is closed as shown by the full line in FIG. 5, the phase of an exciting current in the coil 11' is advanced. FIG. 6 shows phase relationships between the exciting currents 11 and 11', wherein the wave form I designates an exciting current flowing through the exciting coil 11, the wave form II designates an exciting current flowing through the exciting coil 11' when the switch SW is connected to the condenser side as shown in full line in FIG. 5, and the wave form III designates an exciting current flowing through the exciting coil 11' when the swtich SW is closed as shown by the dotted line in FIG. 5.

In operation, when the switch is closed as shown in the full line, an exciting current having the wave form I flows through the exciting coil 11 and an exciting current having the wave form II flows through the exciting coil 11'.

Suppose the rotor 8 is magnetized to provide south polarity by a negative current which starts flowing through the exciting coil 11 of the motor A at the position I-0 in the FIG. 6, while the rotor 8' is magnetized to provide south polarity (see FIG. 7*a*) by a positive current which starts flowing through the exciting coil 11' of the motor B at the position I-0 in FIG. 6. When at a standstill, the pole teeth 8*b* of the rotor 8 are exactly opposite the south pole of the permanent magnet 9 and the pole teeth 8*b'* of the rotor 8' are positioned substantially between south and north poles on the permanent magnet 9'.

In the above case, although repelling forces are generated between the pole teeth 8*b* of the rotor 8 and the permanent magnet 9, the repelling forces are unable to decide direction of rotation by themselves since the pole teeth 8*b* are exactly opposite the south poles on the stator. On the other hand, attracting and repelling forces are generated between the pole teeth 8*b'* of the rotor 8' and the permanent magnet 9' in the motor B; providing a torque on the rotor 8' in the arrow marked direction.

When the pole teeth 8*b'* comes to the points right opposite the north poles on the permanent magnet stator 9', the exciting current II flowing through the exciting coil 11' turns positive since the phase advances from I-0 and II-0 in FIG. 6, magnetizing the rotor 8' to provide north polarity (see FIG. 7*b*). Therefore, repelling forces are generated between the pole teeth 8*b'* of the rotor 8' and the magnet 9' while the pole teeth 8*b* of the rotor 8 continue to be magnetized to provide south polarity, rotating the rotor 8 in the arrow marked direction by repelling and attracting forces generated between the pole teeth 8*b* and permanent magnet 9. The moment the pole teeth 8*b'* of the rotor 8' pass the center lines of the north poles on the permanent magnet 9', the repelling forces present between the pole teeth 8*b'* and the north poles on the permanent magnet 9' cooperate with the repelling forces working between the pole teeth 8*b* of the rotor 8 and the south poles on the permanent magnet 9 function to apply a large torque (see FIG. 7*c*).

The moment the pole teeth 8*b* of the rotor 8 reach the points exactly opposite the north poles on the permanent magnet 9, the rotor 8 and the pole teeth 8*b* thereof are magnetized to provide north poles by the positive current which starts flowing through the exciting coil 11 since the phase advances from II-0 to I-1 as shown in FIG. 6 (see FIG. 7*d*).

By the same token as stated above, everytime the polarities provided by the exciting currents flowing through the exciting coils 11 and 11' change, the polarities to which the rotor 8 and 8' magnetized are reversed, thus rotating the rotors 8 and 8' with attracting and repelling forces in combination in one direction only.

Immediately below, explanation will be given as to the case when the switch SW is closed as shown in dotted line in FIG. 5.

Since the exciting current flowing through the exciting coil 11 is negative at the position I-0 while the exciting current flowing through the exciting coil 11' is positive at the position I-0, the rotor 8 is magnetized in the south polarity while the rotor 8' is magnetized in the north polarity (see FIG. 8a). Therefore, the rotor 8' starts its rotation in the arrow marked direction (in the direction opposite to that shown in FIG. 7). The moment the pole teeth 8b of the rotor 8 pass the center lines of the south poles, the repelling forces present between the pole teeth 8b and the south poles on the permanent magnet 9 cooperate with the repelling forces working between the pole teeth 8b' of the rotor 8' and the north poles on the permanent magnet 9' function to apply a large torque (see FIG. 8b).

Explanation will be omitted as to the movements of the rotors since the operation is performed in the same manner as has so far been explained.

In this embodiment, the pole teeth 8b and 8b' are staggered from each other by 18° (an electric angle of 108°) while the phase difference between the exciting current I and the exciting current II is 60°. However, the stagger between the pole teeth 8b and 8b' can be adjusted within the range of 16° to 20° (an electric angle of 96° to 120°) in accordance with an appropriate selection of the phase difference between the exciting currents.

Although the pole teeth 8b and 8b' of the rotors 8 and 8' are opposed to each other in the above embodiment, it is noted that alternatively the circular body portions 8a and 8a' may be opposed to each other. In this alternative case, the permanent magnets 9 and 9' are fixed to the motor case 1 and the lid 2, respectively, and the pole teeth 8b and 8b' of the rotors 8 and 8' are disposed to point to the motor case 1 and the lid 2, respectively.

Although the present invention has been explained on the embodiment with respect to a synchronous motor, it is apparent to those skilled in the art that this invention can also be applied to a pulse motor. In a pulse motor, the pole teeth 8b and 8b' of the rotors 8 and 8' are staggered from each other by a half of a pole pitch and pulses are alternately applied to the exciting coils 11 and 11' to rotate the rotors 8 and 8'.

As stated above, in the miniature self-starting electric motor according to the present invention, the pole teeth extending from the periphery of one of the two circular body portions and the pole teeth extending from the periphery of the other are staggered from each other by a predetermined electric angle and the switch is selectively connected to either one of the two exciting coils so that the motor starts its rotation reliably in a predetermined direction without incorporating an additional anti-reverse mechanism, e.g. gear means.

In addition, the direction of the rotation can easily be selectively determined by operating the switch.

Further, as described, it is to be noted that, with the instant structure in which the semi-circular iron members are incorporated so that the two rotors, the two permanent magnets and the two exciting coils are separated into each combination of one rotor, one permanent magnet and one exciting coil, it is possible to dispose in the casing the two magnets which have been prepared by assembling materials and simultaneously magnetizing them, so that portions magnetized in the same polarity on both magnets are aligned when viewed in the axial direction.

Furthermore, the compression spring 13 winding around the rotor shaft 6 is contacted at its one end with a shoulder in the recessed portion 10a of the stator and rested at the other end on the boss 7 so that the rotors 8 and 8' are pressed toward the ball 5 by a weak force, thus preventing the rotors from being magnetically vibrated by magnetic fluxes generated by the exciting coils.

What is claimed is:

1. A miniature self-starting electric motor comprising a rotor shaft rotatably disposed in a casing; two rotors fixed to said rotor shaft and each having a circular body portion of soft magnetic material, each said circular body portion having a periphery with pole teeth extending therefrom and spaced from each other at equal angular spacings; two exciting coils each being disposed to face the pole teeth; two permanent magnets each providing radially north and south poles alternating at an equal angle, the poles of each said permanent magnet being axially aligned with poles of the same polarity of the other magnet, the poles of each said permanent magnet facing the pole teeth of the corresponding rotor, the number of poles on each permanent magnet being an even multiple of the number of pole teeth, said two rotors being opposed to each other, the pole teeth of one of said two rotors being staggered from the pole teeth of the other by a predetermined electric angle; the pole teeth of one said rotor being circumferentially offset from the pole teeth and intervening spaces therebetween of the other rotor by another preselected angle; and a condensor alternatively connectible to either one of said two exciting coils for selecting the direction of rotation of said motor.

2. A miniature self-starting electric motor according to claim 1, wherein the pole teeth of one of the two rotors and the pole teeth of the other are in a confronting relation.

3. A miniature self-starting electric motor according to claim 1, wherein the circular body portion of one of the two rotors and the circular body portion of the other are in a confronting relation.

4. A miniature self-starting electric motor according to claim 2, which further comprises two diametrally opposed semi-circular iron members separating said two rotors, said two permanent magnets and said two exciting coils into two units, each unit having one rotor, one permanent magnet and one exciting coil.

5. A miniature self-starting electric motor according to claim 4, in which said two permanent magnets each comprise a cylindrical member and including a stator of synthetic resin material, said cylindrical magnets being fixed in axially spaced relation on the periphery of said stator, said semi-circular iron members having inner peripheral portions insertible between said cylindrical magnets and having projections on the inner peripheries thereof interengaged with the wall of said stator, the radially outer peripheral portions of said semi-circular iron members being axially sandwiched between said two exciting coils and locating said stator within said casing, said cylindrical magnets being magnetizable after assembly with resin stator member to assure that portions of said cylindrical magnets magnetized in the same polarity are in axial alignment.

6. A miniature self-starting electric motor according to claim 5 including bearing bosses on said casing spaced along and rotatably supporting said rotor shaft, said stator having a recessed shoulder surrounding an intermediate portion of said rotor shaft and facing toward one said bearing boss, a thrust member at said one bearing boss, and compression spring means wound around the motor shaft with opposite ends in contact with said stator shoulder and opposed bearing boss for urging said rotor shaft axially against said thrust member with force sufficient to prevent axial magnetic vibration of said rotors by magnetic fluxes passing therethrough during operation of the motor.

7. A miniature self-starting electric motor according to claim 1 including a pair of leads connectible to an alternating current power source, one side of each of said exciting coils being connected to one said lead, a two position switch connected to the other said lead, one said switch position being connected to the remaining end of the first and second ones of said coils directly and through said consenser, respectively, the other said switch position being connected to said remaining ends of said first and second coils through said condenser and directly, respectively, said coils being oppositely wound so as to be magnetized with opposite instantaneous polarities when direct connected across the power source, wherein interposition of said condenser in series with one said coil introduces an electrical phase difference in the opposite magnetization of said two coils, wherein the circumferential offset of the respective pole teeth of said two rotors and said phase difference determine said electrical angle such that for a given position of the rotor shaft with a pole on one said permanent magnet centered between a pair of pole teeth initiating opposite magnetic polarity on the corresponding rotor, a pole of said other permanent magnet is in non-centered opposition to a pole tooth of its corresponding rotor, and the magnetic polarity of said last mentioned pole tooth differs with the two different positions of said switch, whereby when energized from a standstill at any rotative position said rotor shaft will experience a torque in one rotational direction or the other and said rotational direction is determined by setting of said switch.

8. A miniature self-starting electric motor according to claim 7 wherein said phase difference is 60° and the circumferential offset of the pole teeth of the two rotors from each other is in the range of 16°–20°.

9. A miniature self-starting motor according to claim 8 wherein the pole teeth of each rotor are provided on 60° centers and the number of magnetic poles per said permanent magnet is twice the number of pole teeth per rotor, said electrical angle lying in the range 96°–120°.

* * * * *